(12) United States Patent
Segall

(10) Patent No.: US 9,185,224 B2
(45) Date of Patent: Nov. 10, 2015

(54) METHOD AND SYSTEM FOR MANAGING INTERACTIVE COMMUNICATIONS CAMPAIGNS WITH CALL PACING

(71) Applicant: SOUNDBITE COMMUNICATIONS, INC., Bedford, MA (US)

(72) Inventor: Timothy R. Segall, Lexington, MA (US)

(73) Assignee: SOUNDBITE COMMUNICATIONS, INC., Bedford, MA (US)

( * ) Notice: Subject to any disclaimer, the term of this patent is extended or adjusted under 35 U.S.C. 154(b) by 0 days.

(21) Appl. No.: 14/709,351

(22) Filed: May 11, 2015

(65) Prior Publication Data

US 2015/0249746 A1  Sep. 3, 2015

Related U.S. Application Data

(63) Continuation of application No. 14/088,368, filed on Nov. 23, 2013, now Pat. No. 9,071,688, which is a continuation of application No. 12/629,298, filed on Dec. 2, 2009, now Pat. No. 8,594,312.

(51) Int. Cl.
| | |
|---|---|
| *H04M 3/00* | (2006.01) |
| *H04M 5/00* | (2006.01) |
| *H04M 3/523* | (2006.01) |
| *H04M 3/51* | (2006.01) |

(52) U.S. Cl.
CPC .......... *H04M 3/5232* (2013.01); *H04M 3/5158* (2013.01)

(58) Field of Classification Search
CPC ..................... H04M 3/5191; H04M 2203/407; H04M 3/5233; H04M 3/5234; H04M 3/5232
USPC ............... 379/266.07, 88.04, 265.11, 265.12, 379/265.13, 266.08, 265.01, 265.05
See application file for complete search history.

(56) References Cited

U.S. PATENT DOCUMENTS

| | | | |
|---|---|---|---|
| 7,023,979 B1 | 4/2006 | Wu et al. | |
| 7,676,034 B1 * | 3/2010 | Wu et al. | 379/265.01 |
| 8,971,519 B1 * | 3/2015 | Hoffberg | 379/265.11 |
| 2011/0069821 A1 | 3/2011 | Korolev et al. | |
| 2011/0129081 A1 | 6/2011 | Segall | |
| 2014/0205081 A1 | 7/2014 | Segall | |

\* cited by examiner

*Primary Examiner* — Thjuan K Addy
(74) *Attorney, Agent, or Firm* — Christie, Parker & Hale, LLP

(57) ABSTRACT

A Web-based hosted system through which business entities create and manage communications campaigns. The system carries out a communications campaign on behalf of a client. A campaign is a series of calls to a contact list using one or more sub-campaigns. A sub-campaign associates a list of contacts, a script, and a timeframe. An agent typically is a contact center operator. A skill group is a set of agents that are trained to handle a given script. Call pacing enhancements are implemented to allow simultaneous progress on multiple sub-campaigns under a skill group. The techniques enable control over the pacing of individual sub-campaigns when multiple sub-campaigns are running under a single skill group. The service also provides a framework by which a set of "pluggable" pacing models are provisioned and managed, preferably on a per-model basis.

10 Claims, 10 Drawing Sheets

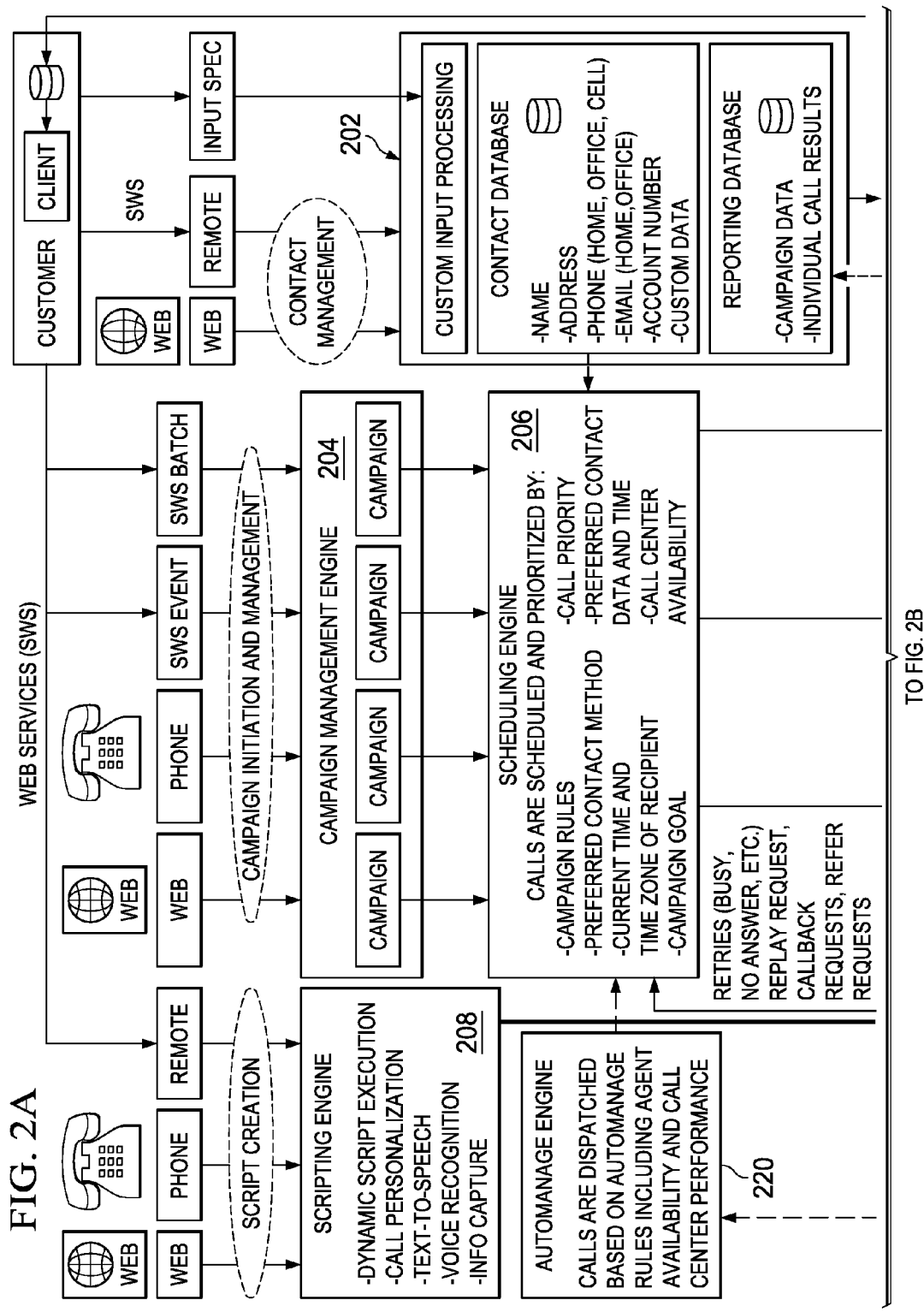

| SUB-CAMPAIGN | PASS | STATUS | PRIORITY (WEIGHT) | INITIAL PERCENTAGE OF AGENTS OFFERED |
|---|---|---|---|---|
| SUB 1 | | | | |
| | PASS 1 | RUNNING | HIGH (4) | 33% |
| | PASS 2 | RUNNING | HIGH (4) | 33% |
| SUB 2 | | | | |
| | PASS 1 | RUNNING | MEDIUM (2) | 17% |
| | PASS 2 | RUNNING | MEDIUM (2) | 17% |
| CALCULATION: 4+4+2+2=12 TOTAL PRIORITY WEIGHT<br>OFFER TO SUB 1, PASS 1 = (4/12)X100 = 33%<br>OFFER TO SUB 1, PASS 2 = (4/12)X100 = 33%<br>OFFER TO SUB 2, PASS 1 = (2/12)X100 = 17%<br>OFFER TO SUB 2, PASS 2 = (2/12)X100 = 17% | | | | |

FIG. 3A

| SUB-CAMPAIGN | PASS | STATUS | PRIORITY (WEIGHT) | INITIAL PERCENTAGE OF AGENTS OFFERED |
|---|---|---|---|---|
| SUB 1 | | | | |
| | PASS 1 | RUNNING | HIGH (4) | 40% |
| | PASS 2 | RUNNING | HIGH (4) | 40% |
| SUB 2 | | | | |
| | PASS 1 | RUNNING | MEDIUM (2) | 20% |
| | PASS 2 | PENDING | MEDIUM (2) | 0% |
| CALCULATION: 4+4+2=10 TOTAL PRIORITY WEIGHT<br>OFFER TO SUB 1, PASS 1 = (4/10)X100 = 40%<br>OFFER TO SUB 1, PASS 2 = (4/10)X100 = 40%<br>OFFER TO SUB 2, PASS 1 = (2/10)X100 = 20%<br>OFFER TO SUB 2, PASS 2 = NOT RUNNING, SO NOT INCLUDED IN CALCULATION | | | | |

FIG. 3B

| SUB-CAMPAIGN | PASS | STATUS | PRIORITY (WEIGHT) | INITIAL PERCENTAGE OF AGENTS OFFERED |
|---|---|---|---|---|
| SUB 1 | | | | |
| | PASS 1 | RUNNING | HIGH (4) | 57% |
| SUB 2 | | | | |
| | PASS 1 | RUNNING | MEDIUM (2) | 29% |
| | PASS 2 | RUNNING | LOW (1) | 14% |
| CALCULATION: 4+2+1=7 TOTAL PRIORITY WEIGHT<br>OFFER TO SUB 1, PASS 1 = (4/7)X100 = 57%<br>OFFER TO SUB 2, PASS 1 = (2/7)X100 = 29%<br>OFFER TO SUB 2, PASS 2 = (1/7)X100 = 14% | | | | |

FIG. 3C

| SUB-CAMPAIGN | PASS | STATUS | PRIORITY (WEIGHT) | INITIAL PERCENTAGE OF AGENTS OFFERED |
|---|---|---|---|---|
| SUB 1 | | | | |
| | PASS 1 | RUNNING | HIGH (4) | 66% |
| SUB 2 | | | | |
| | PASS 1 | RUNNING | MEDIUM (2) | 33% |
| | PASS 2 | PENDING | LOW (1) | 0% |
| CALCULATION: 4+2=6 TOTAL PRIORITY WEIGHT (PENDING PASS IS NOT COUNTED)<br>OFFER TO SUB 1, PASS 1 = (4/6)X100 = 66%<br>OFFER TO SUB 2, PASS 1 = (2/6)X100 = 33%<br>OFFER TO SUB 2, PASS 2 = NOT RUNNING, SO NOT INCLUDED IN CALCULATION | | | | |

FIG. 3D

| SUB-CAMPAIGN | PASS | STATUS | PRIORITY (WEIGHT) | INITIAL PERCENTAGE OF AGENTS OFFERED |
|---|---|---|---|---|
| SUB 1 | | | | |
| | PASS 1 | RUNNING | HIGH (4) | 66% |
| SUB 2 | | | | |
| | PASS 1 | RUNNING | MEDIUM (2) | 33% |
| | PASS 2 | RUNNING | BACKGROUND (0) | 0% |
| CALCULATION: 4+2=6 TOTAL PRIORITY WEIGHT (PENDING PASS IS NOT COUNTED) OFFER TO SUB 1, PASS 1 = (4/6)X100 = 66% OFFER TO SUB 2, PASS 1 = (2/6)X100 = 33% | | | | |
| OFFER TO SUB 2 = SET TO BACKGROUND, SO INITIAL OFFER WILL BE 0. WILL GET OFFERED AGENTS WHEN OTHER PASSES REACHED A BREAK IN CALLING DUE TO TIME ZONE OR HAVE EXHAUSTED ALL NUMBERS TO DIAL. | | | | |

| Skill Group | Contact Rate | Contact Adjust | Auto Manage | Net Contract | Max Rate | Contrast Last 15 min | Agents Assigned | Agents Projected | Pacing Fixed | Pacing Agent | Pacing Auto |
|---|---|---|---|---|---|---|---|---|---|---|---|
| Hotline Skill Group (3) | 330 | 0 % | 0% | 320 | | 42,800 | 25 | 25 | | | |
| Sub-campaign | | | | | | | Priority | | | | |
| Inbound/Inbound 1 | 280 | | | 280 | | 9,400 | | 2 | ● | | |
| Outbound/Outbound 1 | 90 | 0 % | 0% | 90 | 50,000 | 28,000 | Med ▼ | 17.5 | | ● | |
| Call Pass 1 voice | 90 | 0% | 0% | 90 | 50,000 | 9,400 | Med ▼ | 10.5 | | ● | |
| Call Pass 2 voice | 100 | 0% | 0% | 100 | 1,000 | 9,400 | Low ▼ | 7 | | ● | |
| Call Pass 3 text | | | | | | | | | | | |
| Outbound/Outbound 2 | 50 | −5 % | −5% | 40 | | 4,600 | N/A | | ● | | |
| | | | | | | | Med ▼ | 5.5 | | ● | ○ |

Save  Close  Manual (if required)  Multiple pacing models 21,774  0  250  0  2,600  2  2  6,019  0  21s  0

17-Dec 9:00 PM (Local)
SkillGroup1 (1) ▶ Closed

METHOD AND SYSTEM FOR MANAGING INTERACTIVE COMMUNICATIONS CAMPAIGNS WITH CALL PACING

CROSS-REFERENCE TO RELATED APPLICATIONS

This application is a continuation of U.S. patent application Ser. No. 14/088,368, filed on Nov. 23, 2013, which is a continuation of U.S. patent application Ser. No. 12/629,298, filed on Dec. 2, 2009, now U.S. Pat. No. 8,594,312, the disclosures of which are hereby incorporated by reference in their entireties.

BACKGROUND

1. Technical Field

This disclosure relates generally to a method and system for managing interactive communication campaigns over a computer network, such as the Internet.

2. Description of the Related Art

It is known to provide a web-based hosted solution through which business entities create and manage interactive or notification communications campaigns. An example of an interactive communications campaign is a telephone campaign to determine whether a target recipient desires to transfer a credit card balance to a new account, a campaign to remind a recipient that a credit card payment is due and to offer the recipient an opportunity to speak with a customer representative concerning any payment issues, or the like. The hosted solution typically is implemented as an application (or "managed") service provider. One or more business entities ("clients") that desire to use the service typically register and access the service through an on-line (e.g., web-based) portal. In one representative use scenario, the managed service provider entity provides outbound telemarketing services on behalf of participating clients. The campaign typically is provisioned by the client. Thus, for example, using a web-based interface, a participating client defines a script for the campaign, imports a set of contacts, and defines one or more parameters that govern how the campaign is to be run. At a designated time, the service provider initiates the campaign, e.g., by providing the contacts to a set of telephone servers that set-up and manage the telephone calls to the targets of the campaign. During a given outbound call, as noted above, a recipient (a "customer") may be afforded an option to connect to a contact center, e.g., to speak to a customer representative. In such implementations, the hosted solution typically is integrated directly with the contact center's on-premises automatic call distributor (ACD).

BRIEF SUMMARY

A web-based hosted solution (a managed service or system) through which business entities create and manage communications campaigns, such as interactive campaigns that afford target recipients an opportunity to be connected to a contact center. The managed service carries out a communications campaign on behalf of a client. A "campaign" refers to a series of messages to a contact list using one or more sub-campaigns. A sub-campaign associates a list of contacts, a script, and a timeframe. An "agent" typically is a contact center operator. A "skill group" is a set of agents that are trained to handle a given script. Call pacing enhancements are implemented to allow simultaneous progress on multiple sub-campaigns under a skill group. The techniques enable control over the pacing of individual sub-campaigns when multiple sub-campaigns are running under a single skill group.

According to another feature, the service provides a framework by which a set of "pluggable" pacing models are provisioned and managed, preferably on a per-model basis. In this manner, new pacing models (implemented, for example, as Java fragments or JavaScript, or the like) are designed, configured and then added into the system on an as-needed basis. A particular pacing model (or set of models) may operate irrespective of the one or more channels that are being implemented within the campaign or sub-campaigns. The pluggable framework provides the service provider or its users the ability to design, provision, configure, manage and enforce one or more pacing models for a particular campaign or set of sub-campaigns as is necessary to meet a given business objective or policy.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

FIGS. 2A-2B illustrates how an interactive communications campaign is created and managed in the service provider infrastructure illustrated in FIG. 1;

FIG. 3A-3E illustrates various examples of how agents are distributed across a pair of sub-campaigns using priorities according to the subject disclosure;

FIG. 4 is a display interface by which the user can adjust the message volume for a given skill group and sub-campaign;

FIG. 5 is a display interface by which the user can edit the sub-campaign priority (pacing);

FIG. 6 is a display interface by which the user can edit the future pacing model for a given skill group; and FIG. 7 is a display interface by which the user can edit the pacing attributes of a given sub-campaign.

DETAILED DESCRIPTION

Figure 1:
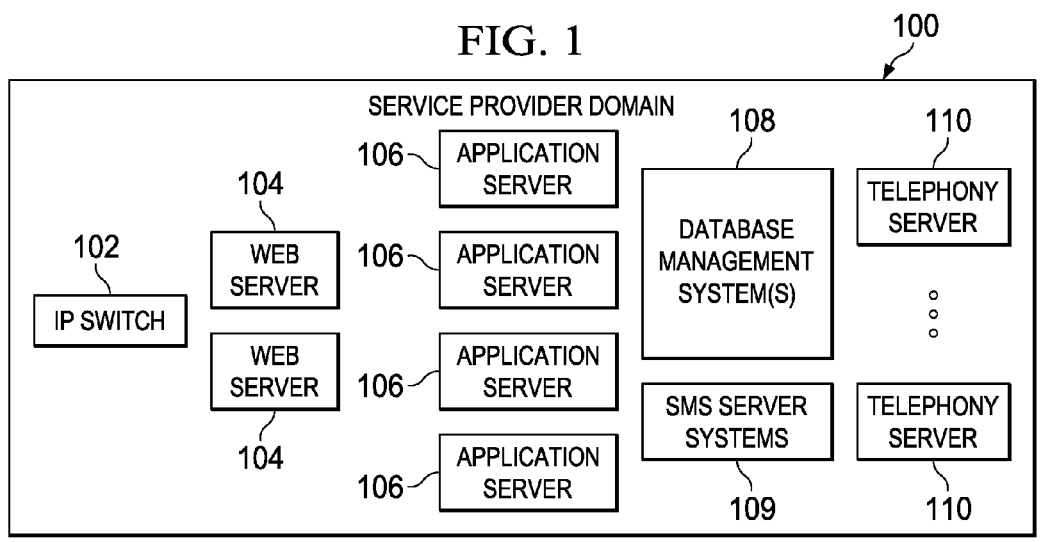
FIG. 1 is a block diagram of a service provider infrastructure for implementing a managed communications campaign service.

FIG. 1 illustrates a representative service provider or system architecture, which in the preferred embodiment is implemented in or across one or more data centers. A data center typically has connectivity to the Internet. The system provides a web-based hosted solution through which business entities create and manage communications campaigns. Campaigns may be interactive or non-interactive. Representative campaigns include, without limitation, account renewal campaigns, balance transfer or consolidation offer campaigns, billing issue campaigns, credit card activation campaigns, fraud alert campaigns, payment or past due reminder campaigns, phone or customer survey campaigns, debt recovery campaigns, late payment with right party verification campaigns, payment reminder with direct connect to contact center campaigns, appointment reminder campaigns, welcome campaigns, account renewal campaigns, affinity cross-sell/rewards program campaigns, crisis management/disaster recovery campaigns, new product offer campaigns, inquiry/web follow-up campaigns, contract renewal campaigns, service availability notification campaigns, promotional offer campaigns, service delivery confirmation campaigns, and the like. The particular type of campaign is not a limitation or feature of the invention.

A business entity (a "client") user has a machine such as a workstation or notebook computer. Typically, a business entity user accesses the service provider architecture by opening a web browser on the machine to a URL associated with a service provider domain. Access may also be through an automated process, such as via a Web services application programming interface (API). Where a web browser is used, the client authenticates to the managed service in the usual manner, e.g., by entry of a username and password. The connection between the business entity machine and the service provider infrastructure may be encrypted or otherwise secure, e.g., via SSL, or the like. Although connectivity via the publicly-routed Internet is typical, the business entity may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, and a set of one or more telephony server machines 110. A representative web server machine 104 comprises commodity hardware (e.g., Intel-based), an operating system such as Linux, and a web server such as Apache 2.x. A representative application server machine 106 comprises commodity hardware, Linux, and an application server such as Oracle WebLogic 10.3 (or later). The database management system 108 may be implemented as an Oracle (or equivalent) database management package running on Linux. A representative telephony server machine is an application server that implements appropriate software applications for call set-up, voice processing, and other call connection and management activities. An application may implement the Media Resource Control Protocol (MRCP). In the alternative, a telephony server machine may execute an application server in conjunction with one or more PSTN, VoIP and/or voice processing cards that provide interconnectivity for telephone-based calling applications. Typically, a voice processing application port or card has a finite number of supported ports. In a high volume call environment, there may be several web server machines, several application server machines, and a large number of telephony server machines. Although not shown in detail, the infrastructure may include a name service, FTP servers, MRCP (Media Resource Control Protocol) servers, load balancing appliances, other switches, and the like. Each machine typically comprises sufficient disk and memory, as well as input and output devices. The software environment on each machine includes a Java virtual machine (JVM) if control programs are written in Java. Generally, the web servers 104 handle incoming business entity provisioning requests, and they export a management interface that is described in more detail below. The application servers 106 manage the basic functions of generating campaign scripts, managing contacts, and executing campaigns. The telephony servers 110 handle most telephony-related functions including, without limitation, executing outbound calls and forwarding calls to a contact center. The particular hardware and software implementation details described herein are merely for illustrative purposes are not meant to limit the scope of the present invention.

In a representative embodiment, a typical machine in the service infrastructure is a processor-based server running Linux, and the server includes a telephone interface. A typical interface has up to 240 ports, and each port may be considered a separate telephone line. There are typically a set of such servers operating at a given location (e.g., an Internet data center). The following is a typical operation of the service. Using a Web browser or the Web service API, a client provisions a campaign, provisioning a script to be played to a target customer. The scope and content of the script will depend on the campaign. The client also provides the service provider with contact information for a set of persons, who are the target recipients of the campaign. In operation, the system batches a subset of those contacts to one of the machines in the server farm. A control routine executing on the machine takes a first contact in the subset and assigns the contact to an available port. The script is then initiated and the interface card initiates a call over a port. When the recipient's phone is answered, the system determines whether a human being has answered the call (as opposed to an answering machine, a fax, or the like). If a human being has answered, the script plays a set of prompts (basically a set of scripted questions). During the call, if the target recipient takes a given action, a direct connect (DC) function is initiated. In particular, the system places the call on hold, opens up a separate line to a contact center telephone number (typically provisioned by the client), waits for an agent to respond, places the responding agent on hold, and then bridges the customer to the agent. The system then disconnects. In an alternative, the DC function may take place whether or not the recipient actively initiates it, e.g., by just having the system inform the recipient to "please hold" while the connection to the contact center is established by the service provider.

The contact center may be owned, operated or managed by a third party. The service provider may manage the agents directly. A representative contact center includes automatic call distribution (ACD) functions. As is well-known, an ACD is a computer-implemented and controlled telephone system that distributes calls to contact center agents equitably and gathers statistics about the agents. When the service provider controls and/or manages the agents directly, the provider infrastructure may include a dialer, which is an automatic telephone dialing system. A dialer initiates outbound call from a list of telephone numbers, turns a call over to an agent when a human being responds, and gathers statistics about agents. Such ACD and dialer technologies are well-known.

Figure 2B:
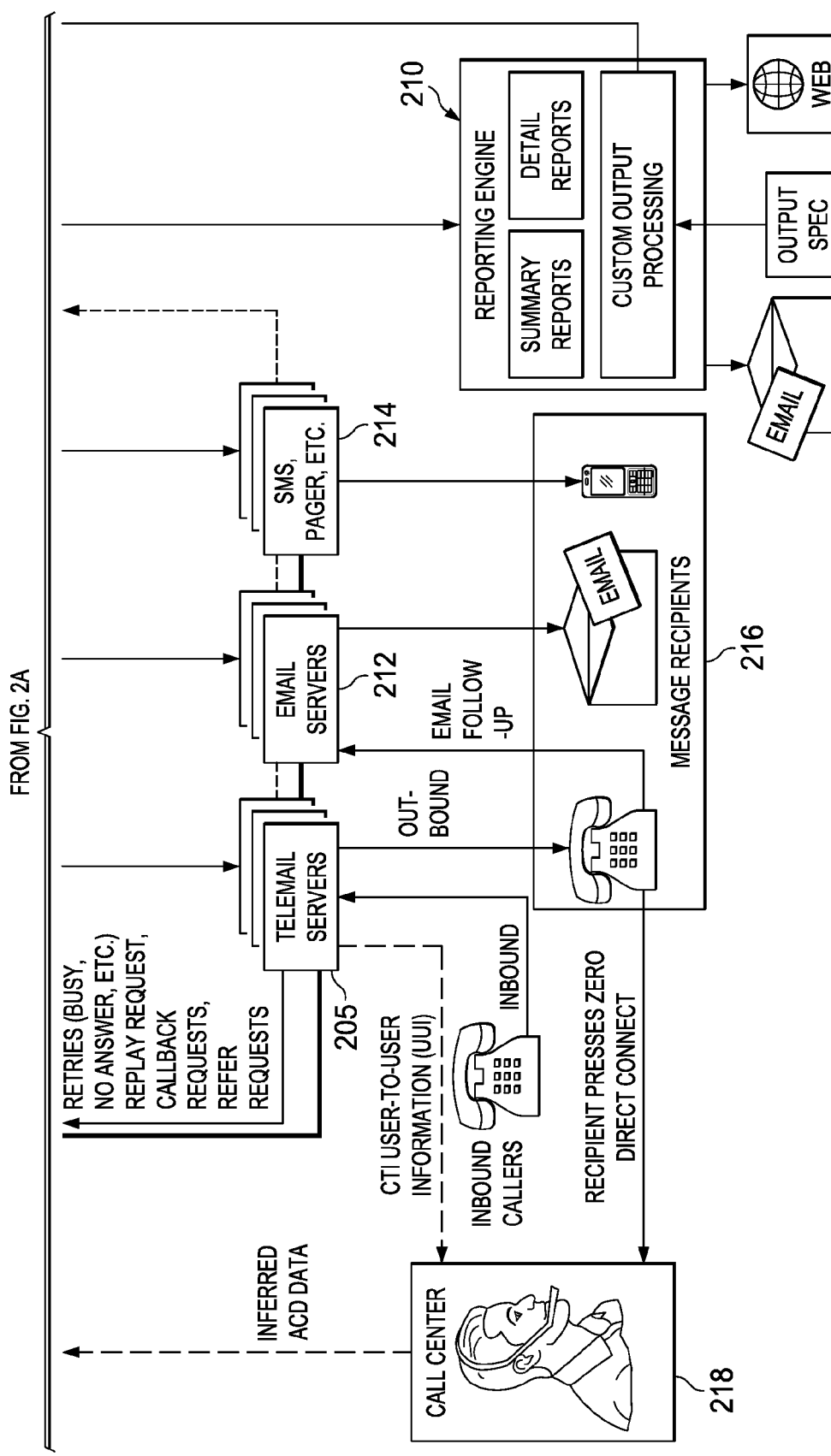

Using the service provider infrastructure, a business entity can create, execute and manage a campaign. As noted above, a campaign may have associated therewith one or more "sub-campaigns." Using a Web interface, a client loads a list of contacts who will be called and associates that list with a script. A "sub-campaign" refers to one or more passes through a contact list that has been bound to a script and that has been associated with a given timeframe. Thus, a "sub-campaign" associates at least the following items: a list of contacts, a script, and a timeframe. Additional details regarding sub-campaigns are set forth below. As noted above, a script determines what will happen during a phone call. Typically, a script is formatted as XML and specifies a sequence of audio prompts that are played and what happens when the recipient takes certain actions such as pressing a button on the phone or speaking a response. As noted above, a direct connect to the contact center may be carried out automatically (merely when the system determines that the call has been answered by other than an answering machine) and thus the script may designate this functionality. One or more contact lists are stored in a contact database, and typically a contact list comprises a set of contacts. A contact typically is an individual in the contact database, and this individual is sometimes referred to as the "customer" (as, technically, the individual is a customer of the client using the managed service). A contact can include home, work or cell numbers, a client identifier, an email address, or the like. Also, contacts typically include first name, last name, company and other information. With reference to FIGS. 2A-2B, and as described above, a business entity connects to the service provider, authenticates, and then uses one or more applications to create, execute and manage the campaign. These applications execute on the application server machines and operate in association with one or more databases that are supported within the database management system. These applications include, for example, a contact management application 202, a campaign management engine 204, a scheduling engine 206, and a scripting engine 208. The contact management application 202 handles the receipt and storage of the contact list(s) uploaded (e.g., via FTP or otherwise) to the system by or on behalf of the business entity client. The scripting engine 208 handles the creation and managing of the campaign scripts, using instructions entered by or on behalf of the business entity client via a web-based interface or Web services API. The campaign management engine 204 manages the campaign by interoperating with the scheduling engine 206, which in turn interoperates with the telephony servers 205 to execute the campaign. The business entity client evaluates or monitors the campaign from summary, detail and/or custom reports generated by a reporting engine application 210. Campaign evaluation and monitoring may also be performed via a Web-based user interface, or in an automated manner via an API. Notification campaigns are executed using email servers 212 and SMS (or MMS) servers 214, or by other means, such as by telephone.

As also illustrated in s 2A-2B, after connecting an outbound call to a target customer 216, the customer may elect to be connected to the contact center 218 (typically a third party contact center) or the system may perform that direct connect automatically once it determines that a human being (as opposed to an answering machine) has answered the outbound call. The system typically obtains information about the contact center's performance during a given communications campaign, commonly without requiring a direct connection between the infrastructure and a contact center's on-premises ACD. This enables the managed service provider to integrate with both its business entity clients and with their associated contact center environments rapidly and efficiently. The interconnectivity between the managed service provider and the contact center may be "inferred" from how calls that originate from the service provider to the target recipients (who have expressed an interest in being connected to the contact center) are actually handled. This "indirect" connectivity is illustrated in FIG. 2 by the control engine 220, which can be provided in software as a set of software instructions executable on a processor. The engine is responsible for dispatching messages at an appropriate rate while ensuring that all customer-requested rule parameters (as described below) are honored. Examples of such parameters include: number of agents available at the contact center, maximum hold time at the contact center, client abandon rate prior to speaking to a contact center, number of bad numbers reached on the outbound dial, and so forth. Generally, for a given client campaign or sub-campaign, the engine 220 decides on an initial message dispatch rate based on the client-requested parameters (and, optionally, on historical data from like campaigns or sub-campaigns). Once the campaign or sub-campaign, as the case may be, starts running, the engine 220 monitors the parameters and ensures that they remain within tolerance. If an identified parameter exceeds the client-defined value, then a system action rule (e.g., adjusting the message dispatch rate, suspending the sub-campaign, or the like) is applied and any client notification requested is issued.

Additional details regarding the functionality of the engine 220 are described in U.S. Publication No. 2007/0172050, which is commonly-owned.

As noted above, preferably a web-based interface is provided to enable a business entity client to create a set of one or more management rules that, when triggered during the campaign, cause the infrastructure (and, in particular, certain control applications therein) to take certain control actions in real-time, preferably based on campaign performance. A campaign may include several preset strategies that a client may choose to change based on day of week or time of day.

As used herein, the following terms have the associated meanings. A "campaign" refers to an overall series of messages to a contact list using one or more sub-campaigns that use a given script. Campaigns also act as templates for the sub-campaigns that are created under them. A campaign typically has a preset configuration that applies to all of its sub-campaigns. As noted above, a "sub-campaign" refers to one or more passes through a contact list using a script and that is constrained to a particular timeframe (or at a set of one or more such times). A sub-campaign typically runs under an existing campaign. A "script" as noted above determines what happens during a customer interaction. Commonly, the script specifies a sequence of audio prompts that are played to a client (an end user who receives a call) and what happens (the contact center connection) when the recipient takes certain actions (such as pressing a button on the phone or speaking an answer to a query). The script may also specify other actions, such as effecting a contact center connection automatically when detecting that a human being has answered. The nature and type of actions set forth in a script thus may be quite varied, and this disclosure is not limited to any particular process flow within a script.

An "agent" typically is a contact center operator. A "skill group" is a set of agents that are trained to handle a given script. In one embodiment, a skill group defines the number of agents who are scheduled to be on duty at various times of the day on various days of the week, as well as the phone number to use to contact those agents. A skill group can be shared across multiple sub-campaigns or over multiple physical facilities (e.g., telephone numbers). A script may cause the routing of direct connect calls to different skill groups based on the path through the script. A client of the service may assign a skill group to a sub-campaign when it creates the sub-campaign, whereupon the agents in that skill group are then responsible for handling any incoming messages for that sub-campaign. Agents in a skill group become "live" according to a schedule or upon login to the service provider. Thus, in one embodiment a "live" agent is an agent that has been registered with the service provider, e.g., using a supervisor dashboard or a contact center schedule. A "busy" agent is an agent currently assisting a client. An "available" agent is an agent waiting for work. A "break" is a state when the agent is away from his or her station. The acronym "ACW" refers to "after-call-work" or agent processing, which occurs after a particular customer service is completed and before the agent is servicing a new customer.

In one embodiment, agents in a skill group may be automatically allocated to a particular sub-campaign based on a priority of each running sub-campaign. This is not a requirement, however. Thus, for example, sub-campaigns with a higher priority are given as many agents as they can use before a lower-priority sub-campaign is considered. Sub-campaigns of equal priority are allocated agents according to a number of agents that can be used (or the number of available contacts) in a next time period (e.g., 5 minutes). In the alternative, such prioritization of sub-campaigns need not be enforced across agents in a skill group, thereby enabling more equal access to the agents. The agents allocated to each sub-campaign typically changes over time as the number of available contacts changes (which affects the number of agents that can be used by each sub-campaign). Preferably, the system adjusts the rate for a sub-campaign based on several factors: the number of agents currently utilized by the sub-campaign, the percentage of attempts that result in a direct-connect attempt, and an average length of a successful direct connect call.

As noted above, agent allocation is not a requirement. In the alternative, agents in a skill group are either assisting a client or are idle. They may receive work from any sub-campaign currently assigned to the skill group. In this embodiment, a priority value determines if a particular sub-campaign should be dialed at a faster rate than another. This results in one sub-campaign generating more direct-connects and requiring more agents from the pool of available agents.

Typically, a skill group is based on one or more business requirements. For example, skill groups may be based on skill type, language skills, skill level, or other such factors. When a new sub-campaign is created, a skill group is assigned to that sub-campaign. The schedule for the skill group then determines the messaging rate at any given time. As more agents come on duty, typically the rate increases to keep those agents busy. When fewer agents are on duty, however, the rate decreases to avoid long hold queues for the customers. As noted above, a single skill group can be assigned to multiple sub-campaigns at the same time. Calls from each sub-campaign preferably are sent to any available agent in the skill group, so a given agent should be trained to handle work from each of the sub-campaigns.

There may be different types of skill groups, such as a standard skill group, and an enhanced agent mode skill group. The standard skill group typically is a skill group to which a single phone number is assigned, and that number is a default phone number when there is no other number defined in the script. A standard skill group typically does not use a service-side hold queue, as defined below. With a standard skill group, agents always hang up after the client call has completed. Caller ID can be used to generate an agent screen pop-up window with the correct customer information if the client's infrastructure supports the capability. As an alternative, an audible "whisper" with customer information can be played for the agent prior to completing the connection. Agents may take advantage of a service-side hold queue to "stay-on-line" (remain connected and to receive a next customer after the last customer hangs-up). If agents remain connected, caller ID typically is not used for the screen pop-up because, typically, caller ID cannot be changed after the first call the agent's phone has been placed. If the enhanced agent mode skill group mode is used, contacts connect directly to a specific agent who has his or her own unique telephone number. Thus, when this type of skill group is configured, individual agents are added (by name) together with the associated telephone numbers. In this configuration, each agent has a unique phone number, or each agent may be set up with a different extension where one or more agents share the unique phone number. As with the standard mode configuration, agent mode skill groups use a pre-defined schedule. Individual agents, however, can each have a custom schedule or can participate in a common schedule group. The service provider can track individual agent activity in this mode, and agents use the hold queue and can stay-on-line as described above. In this mode, caller ID is not used for an agent screen pop-up window, and agents who are not actively allocated to a running sub-campaign are identified as unassigned.

Pacing Enhancements

The following definitions apply to various pacing enhancements that are described below.

As used herein, "priority" refers to a weight that is assigned to each sub-campaign indicating if that sub-campaign should be called at a greater or lesser rate than other sub-campaigns in the skill group.

An "intensity" refers to an adjustment that can be made to the rate of an individual sub-campaign or all sub-campaigns under a given skill group.

By way of further background, when an agent is made available to a skill group, a "pre-allocation" may refer to the situation where the agent is allocated to a specific sub-campaign and remains there until there is not enough work to support that agent; pacing for the sub-campaign is then based on how many agents have been pre-allocated. Agents, as will be seen, need not be pre-allocated or even allocated.

The term "just-in-time allocation" refers to the situation where a calling rate for each sub-campaign is determined by looking at a requested number of agents for a given skill group; just-in-time allocation is designed to keep a portion of those agents busy. With just-in-time allocation, when a direct connect is made, the agent used is taken from the available pool and then returned to the pool when the direct connect is finished.

A "running pass" refers to a pass that is part of a resumed sub-campaign and is within a specified calling time. Thus, e.g., if it is currently 9 AM and a pass is set to run from 1 PM-4 PM, that pass is not running, even if the sub-campaign it is currently part of is not paused.

As described herein, call pacing enhancements include just-in-time agent allocation (as opposed to pre-allocation), as well as simultaneous progress on sub-campaigns running under a same skill group. In addition, the system provides for user control over a priority of individual sub-campaigns, therefore allowing for control over the distribution of work among sub-campaigns running the same skill group. In addition, this disclosure describes improvements to the agent pacing model, with a goal of more closely matching requested number of contacts to the contact center.

Just-in-time agent allocation as provided herein allows for a significant change in the way that resources are used across sub-campaigns in the same skill group. The following describes a variety of scenarios as well as how resources are used in each case.

A basic process for determining messages per minute for each sub-campaign is as follows. First, the application (e.g., scheduling engine 206) looks at the number of agents that have been requested for the skill group by the user. Second, the application offers use of all or a portion of those agents to the passes in each sub-campaign under the skill group. Division of the offer is based on the number of running passes in each sub-campaign. The sub-campaign passes preferably make their own usage projections. Thus, for example, if the pass is constrained by time zone or limited records to be dialed, it projects use of a smaller number of agents, and vice versa. Then, messaging for each pass is set at a rate intended to keep busy either the number of agents projected by the pass or the number of agents offered to the pass, whichever is smaller. If a given pass will not use all the agents offered to it, those agents can be offered to a pass that had previously been offered less agents than it had projected it would use. The above-identified process steps are repeated periodically (e.g., once per minute) and/or as a result of certain actions, such as a new sub-campaign being started, or a sub-campaign being paused.

Preferably, sub-campaign projections are based on one or more data sources: system defaults, "cousin" data, or sub-campaigns that have run in the same campaign, averages from a currently running sub-campaign, and activity in the sub-campaign over a given period (e.g., the last 15 minutes).

The following examples demonstrate how agents will be used if all sub-campaigns are running with equal priority and no adjustments to intensity. The number of agents is set at the skill group. The general rule is that, assuming equal priorities, agents are initially offered in equal proportion to all currently running passes under a given skill group. The calculation for any given pass is then 100%/number of currently running passes.

Thus, for a single sub-campaign with a single pass, the sub-campaign's single pass will be offered all available agents.

For two or more sub-campaigns with single passes, the agents will be offered equally across the passes.

For a single sub-campaign with multiple passes that do not run concurrently, each pass will be offered all available agents while it is running. For example, if pass 1 runs from 9 AM-12 PM and pass 2 runs from 7 PM-9 PM, pass 1 will be offered all agents while it runs and then pass will be offered all agents while it runs.

For a single sub-campaign with multiple passes that run concurrently, agents will be offered equally between them. For example, if pass 1 calls device 1 between 8 AM and 12 PM and pass 2 calls device 2 between 8 AM and 12 PM, each pass will be offered 50% of the agents. Because pass 2 will be quickly drained of accounts as they flow slowly from pass 1 into pass 2, pass 2 will likely not project a need for as many agents as it is being offered. As the application adjusts periodically (e.g., each minute), the likely result is that pass 1 will be offered a larger percentage of the agents.

For two or more sub-campaigns with multiple passes that do not run concurrently, each running pass will be offered an equal number of agents.

For two or more sub-campaigns with a mixture of passes that are running concurrently, each running pass will be offered an equal number of agents. For example, if sub-campaign 1 has 2 concurrently running passes and sub-campaign 2 has 1 pass that is currently running, each pass will be initially offered ⅓ of the agents. Again, if one of the passes does not project use of all the agents it is being offered, unused agents will be redistributed equally to passes whose projected use is greater than the application initially offered.

As noted above, priority allows the user to put a relative weight on any pass (or all passes for a sub-campaign) that can influence the application to offer a greater number of agents to that pass. The application allows for varied levels of priority, each with an associated weight that is then used to calculate the offered number of agents. In one embodiment, there are five (5) levels of priority, but this is not a limitation: (1) mandatory (weight=10), (2) high (weight=4), (3) medium (weight=2), (4) low (weight=1), and background (weight=0). Of course, the values of the above-identified weights can be varied. The percent distribution for a given running pass is then calculated as follows: (weight of pass/sum of weight of all running passes)×100. For example, if one pass is set to a "high" priority and another is set to a "low" priority, the weight of the "high" pass is 4 and the total weight of all running passes is (4+1) or 5. The percent distribution for the high pass will then be (⅘)×100, or 80%. This will be the initial offer presented to the pass in this example. Typically, passes set to "background" will not be offered any agents unless there are no other running passes with higher priorities or all other running passes project using fewer agents than they are being offered.

The following examples demonstrate how agents may be used if sub-campaigns or passes are set to differing priorities.

Where there are multiple sub-campaigns with the same number of passes and different priorities, preferably priority is set at a sub-campaign level using a user interface (UI) or other management interface or function. Priority also may be set at the pass level. FIG. 3A illustrates a representative calculation and allocation multiple sub-campaigns with the same number of passes and different priorities (e.g., high and medium). FIG. 3B illustrates a representative calculation and allocation for a pair of sub-campaigns each with the same number of passes and different priorities but where not all passes are running. FIG. 3C illustrates a representative calculation and allocation for the pair of sub-campaigns, where the sub-campaigns have differing numbers of passes and different priorities, but with all passes running. FIG. 3D illustrates a representative calculation and allocation for the pair of sub-campaigns, where the sub-campaigns have differing numbers of passes and different priorities, but with not all passes running. FIG. 3E illustrates a representative calculation and allocation for multiple sub-campaigns with different numbers of passes and different priorities, and where one pass is set to "background."

The pacing enhancements herein also include the ability for the user to perform intensity adjustments. Thus, if a user finds that a current messaging rate is not resulting in an expected number of direct connects, the user may wish to influence the rate either higher or lower. The application allows for increasing or decreasing the rate at the sub-campaign or skill group level, as is now described. Adjustments at either level may be limited to a range (e.g., −100% to +200%), but this is not a limitation. Preferably, adjustments may be made in gradations, e.g., 10%, but this is also not a limitation.

The effects on rate depend on where the adjustment is made. If the adjustment is made at a sub-campaign level, the specified percentage adjustment is applied to the rate per minute on all passes in the sub-campaign. For example, if pass 1 of a sub-campaign is currently running at 100 messages per minute, an adjustment of +10% volume on the sub-campaign causes the rate on pass 1 to increase to 110 messages per minute (an increase of 10%). Additional adjustments are made based on the application's target rate; thus, a later increase to 20% would be based on the rate of 100, not 110.

If the adjustment is made at the skill group level, the specified percentage adjustment (up or down) is applied to the rate per minute on all passes in all sub-campaigns under the skill group. For example, if there are 2 sub-campaigns running in a skill group, each with a single pass running at 100 per minute, and the volume on the skill group is increased 10%, both passes increase to a rate of 110 messages per minute.

If the adjustment is made at both the skill group and the sub-campaign level, the effect on the calling rate is found by multiplying the two adjustments. For example, if a +10% adjustment is made at the skill group level and a corresponding +10% is made at the sub-campaign level, the overall effect on the sub-campaign is +21% (1.10×1.10=1.21). For a pass running at 100 messages per minute, this represents a change to 121 messages per minute. If, however, a −10% adjustment is made on the sub-campaign and a +10 adjustment is made at the skill group level, the overall effect on the sub-campaign is −1% (0.9×1.10=0.99). For a pass running at 100 messages per minute, this represents a change to 99 messages per minute. Of course, the above examples are merely exemplary.

Preferably, adjusting the intensity does not affect the number of agents offered to a pass.

Although any convenient technique may be used, a user interface is used to adjust the intensity. Preferably, each skill group and sub-campaign includes a control for increasing or decreasing the intensity. This can be done by selecting the control, making the adjustment, and then saving the selection. Preferably, each sub-campaign and pass includes a control for adjusting priority. Selecting a priority control opens a dialog that shows priority for all sub-campaigns in the skill group, and each can be adjusted prior to saving changes or canceling the action. If the priority of a sub-campaign is changed, preferably the same priority is copied to all passes in that sub-campaign. The effects of priority preferably are then represented on screen by an associated percentage of agents offered, such as illustrated in FIGS. 3A-3E. These percentages change if changes to the priorities are made. If desired, the UI may expose an advanced management dialog. Once selected, the dialog screen shows all sub-campaigns in a skill group and allows al of the agent, call volume and priority adjustments to be made in one place.

This disclosure provides numerous advantages. Using the described invention, agents avoid ending up in a "pending" state, such as occurs with pre-allocation where another sub-campaign is using all agents or a sub-campaign is waiting for a next time zone to become available for calling. In addition, with prior techniques, agents may sometimes be allocated in such a way that a largest sub-campaign gets all resources in a skill group, leaving any other sub-campaign to wait for resources to free up. If the large sub-campaign is sufficiently large, it may mean that less progress is made on other sub-campaigns, but this issue is ameliorated by the techniques disclosed herein. In addition, in known techniques it has not been possible to force agents to be allocated to another sub-campaign in a same skill group; the subject invention enables distribution of agents to be influenced and managed effectively. Further, in the prior art call volume typically is increased in only one of two ways—increasing the number of agents, or increasing a utilization rate. The techniques described herein enable intensity to be controlled (increased or decreased) more dynamically and efficiently. The present invention also enables the system to provide a user prompt and useful feedback when changes are made to the agent number of utilization percentage.

By dynamically allocating agents based on priority of the sub-campaign and/or by using a volume control to adjust the call rate at the skill group and/or sub-campaign level, the application progresses on multiple sub-campaigns at once. As much as possible, individual agents are neither over-utilized nor under-utilized. These techniques help ensure that a given contact list is finished by a certain time, and enable the application to maintain desired service levels. By setting priority of the sub-campaign (the passes), the system automatically accommodates for changes in the total agent pool. In addition, the system can perform just-in-time agent allocation accurately and when required. This enables appropriate agent allocation adjustment for inbound traffic, and appropriate sub-campaign/call pass priority propagation.

Using a simple UI or other control interface, the user can quickly adjust volume targets and define the agent pool (skill groups) and the campaign specifics.

Figure 4:
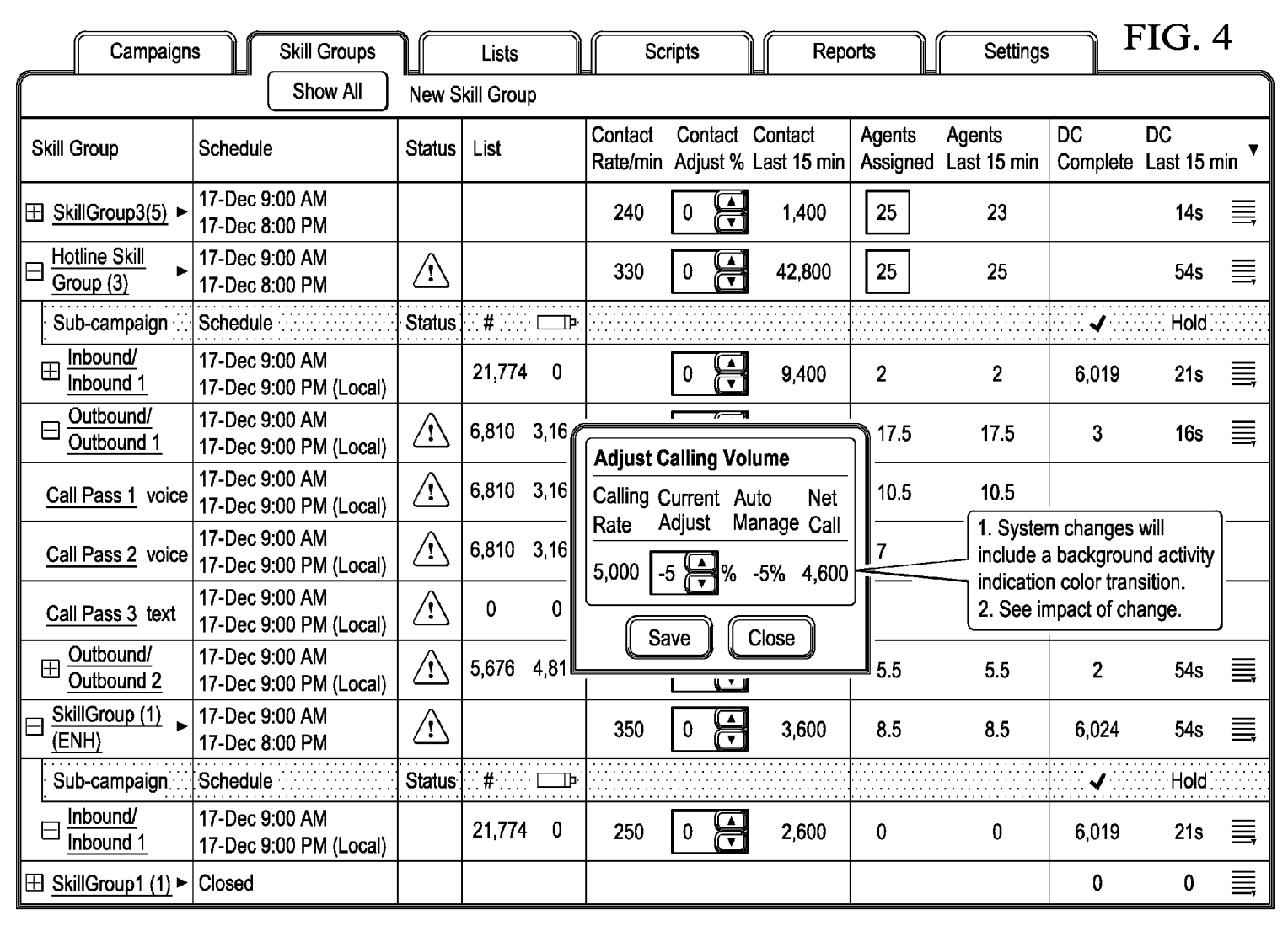

Thus, for example, FIG. 4 is a display interface by which the user can adjust the volume for a given skill group and sub-campaign.

Figure 5:
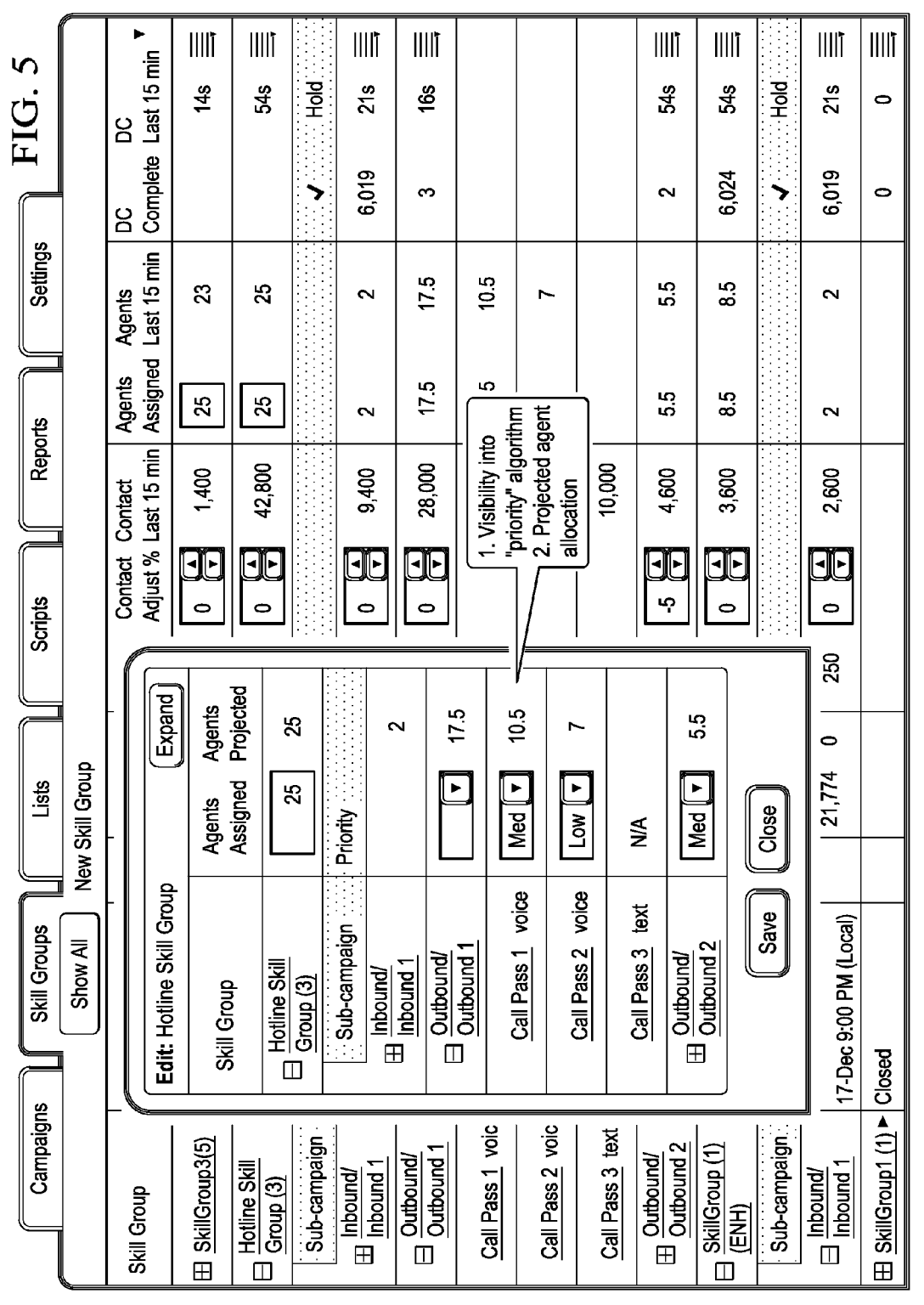

FIG. 5 is a display interface by which the user can edit the sub-campaign priority for an agent pacing model (as defined below).

Figure 6:
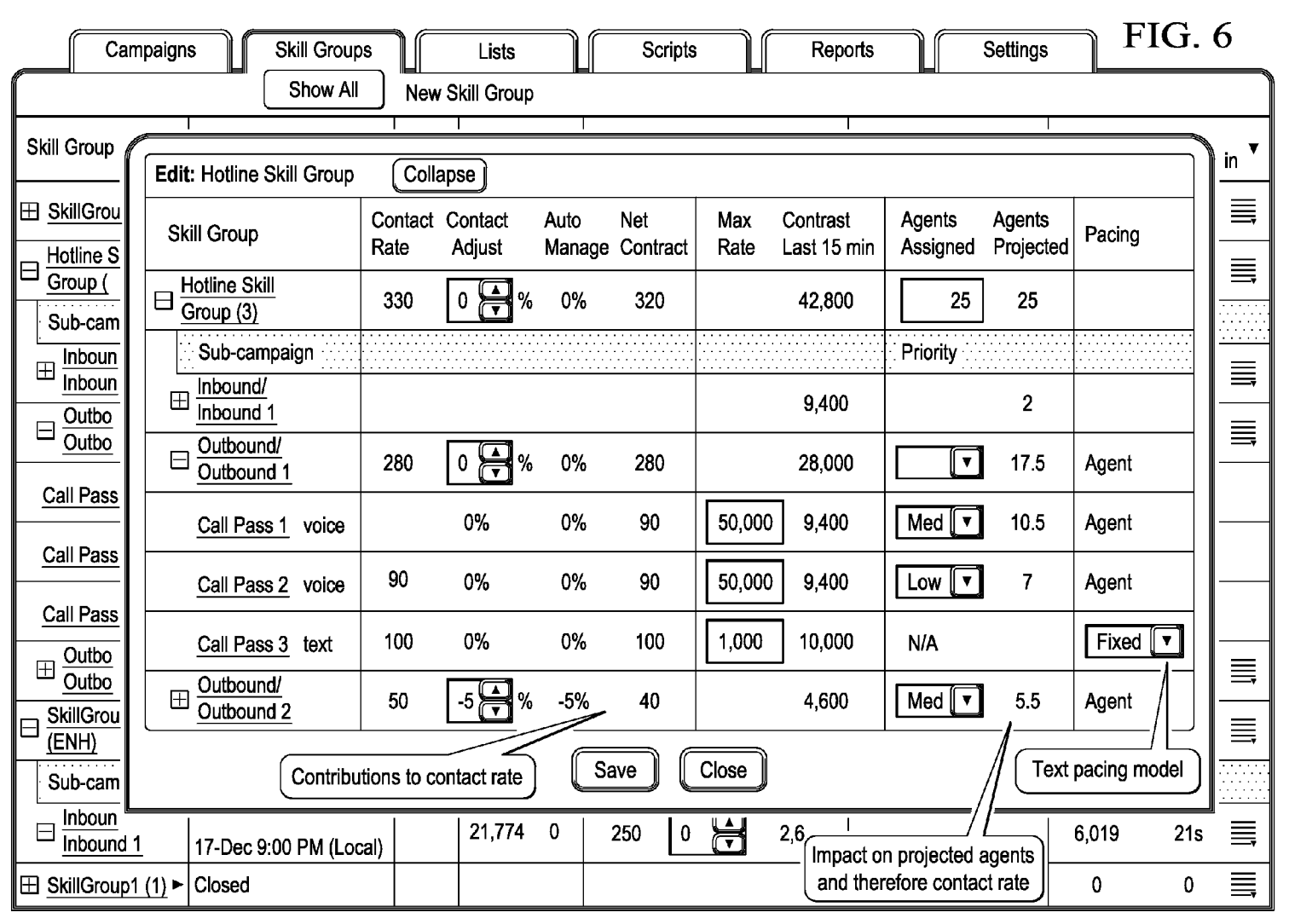

FIG. 6 is a display interface by which the user can edit the future pacing model for a given skill group.

FIG. 7 is a display interface by which the user can edit the pacing attributes of a given sub-campaign.

The illustrated display interfaces enable user control over the priority of individual sub-campaigns, therefore allowing for control over the distribution of messaging among sub-campaigns running under the same skill group. The interface enables quick access to adjustments of message volume, as well as a visual indication of the impact of a particular adjustment.

A particular campaign may involve multiple channels of communication such as voice, text, email, AVM, and so forth. Thus, the techniques of pacing individual sub-campaigns as described above may be applied to sub-campaigns involving in such a multi-channel campaign so that the benefits described (e.g., making concurrent progress on the multiple sub-campaigns) can also be achieved for the multi-channel implementation. Stated another way, the pacing enhancements described herein are not limited to single channel campaigns but apply as well to campaigns that span multiple communications channels. As an example, a multi-channel campaign may involve a voice pass and a text pass. Using the techniques described herein, one or both of the rates of those sub-campaigns may then be adjusted, e.g., the rate of the text-based campaign may be adjusted based on agent utilization (driven, e.g., by CTI data).

According to another aspect of this disclosure, the particular pacing algorithm implemented need not take channels into consideration at all. In this approach, the pacing algorithm, in effect, is blind to whether a single channel or multi-channel implementations are being carried out with respect to the campaign (or sub-campaign). In this approach pacing is performed generically on messages, irrespective of the communication channel designation.

Preferably, the system UI exposes to a user a set of "pluggable" pacing models that are provisioned and managed, preferably on a per-model basis. In this manner, the system provides a framework by which new pacing models (implemented, for example, as Java fragments or JavaScript, or the like) are designed, configured and then added into the system on an as-needed basis. The detailed discussion above has referenced several such models. Thus, for example, a representative system may include one or more of the following pacing model types:

(a) fixed pacing—wherein a given number of messages per time period are processed;
(b) agent-based pacing—wherein a given number of agents are to be assigned to the campaign or sub-campaign during a given time period;
(c) auto-pacing—wherein a campaign or sub-campaign starts and end at specified times and a given number of messages must be communicated during that time;
(d) historical pacing—wherein a campaign (e.g., an inbound campaign) takes into consideration past activity or activity from third party systems;
(e) predictive pacing—wherein a predictive dialer (or the like) is associated with the campaign or sub-campaign and is being used to manage the messages.

The above nomenclature for the pacing models is merely exemplary and should not be taken to limit the disclosure. The particular pacing model(s) and their configuration details may be varied within the context of the pluggable framework. As noted above, preferably the user interface exposes controls that are used by the operator to provision and configure the model. Thus, for example, FIG. 6 includes a right-most column titled "Pacing" by which the particular model may be associated with a particular sub-campaign. FIG. 7 includes a right-most column that identifies three (3) different pacing models that can be selected individually with respect to identified sub-campaigns. Preferably, when a given number of agents in a skill group are associated with multiple models, the fixed and auto-pacing models use those agents on a priority basis; whatever remaining agents exist in the skill group may then be allocated to the remaining pacing models.

Thus, a single campaign may comprise multiple sub-campaigns, and each sub-campaign may be separately provisioned according to a given pacing model. As noted above, a particular pacing model (or set of models) may operate irrespective of the one or more channels that are being implemented within the campaign or sub-campaigns. The pluggable framework provides the service provider or its users the ability to design, provision, configure, manage and enforce one or more pacing models for a particular campaign or set of sub-campaigns as is necessary to meet a given business objective or policy.

As previously noted, the hardware and software systems in which the subject matter herein is illustrated are merely representative. The described functionality may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation. A given machine includes network interfaces and software to connect the machine to a network in the usual manner. As illustrated in FIG. 1, the subject disclosure may be implemented as a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

Having described my invention, what I now claim is set forth below:

1. A system for managing outbound communication campaigns comprising:
   processor; and
   memory, wherein the memory stores instructions that, when executed by the processor, cause the processor to:
      identify a plurality of sub-campaigns in a particular outbound campaign, wherein each of the sub-campaigns is configured for a particular number of passes;
      identify, for a first pass of a first one of the plurality of sub-campaigns, a number of agents offered to the first pass;
      identify, for the first pass, a number of agents projected to be used for the first pass; and
      set the first pass at a rate that is to maintain busy the number of agents projected to be used for the first pass, or the number of agents offered to the first pass, whichever is smaller.

2. The system of claim 1, wherein the instructions further cause the processor to:
   determine whether the first pass is anticipated to use all agents offered to the first pass;
   if the first pass is not anticipated to use all the agents offered to the first pass, offer an agent of the agents offered to the first pass, to a second pass of the first one of the plurality of sub-campaigns.

3. The system of claim 1, wherein the identifying of the agents projected to be used for the first pass is based on at least one of use requirements from another sub-campaign, an average of use requirements from a currently running sub-campaign, or use requirements as evidenced by recent activity in the sub-campaign for which the projection is being done.

4. The system of claim 1, wherein the first one of the plurality of sub-campaigns is associated with a priority.

5. The system of claim 4, wherein the identifying the number of agents projected to be used for the first pass is based on the associated priority of the first one of the plurality of sub-campaigns.

6. The system of claim 1, wherein the identifying the number of agents projected to be used for the first pass is based on a number of agents requested for a skill group.

7. The system of claim 1, wherein the identifying the number of agents projected to be used for the first pass is based on the particular number of passes in each sub-campaign.

8. The system of claim 1, wherein the instructions further cause the processor to:
   pace individual sub-campaigns of the plurality of sub-campaigns such that concurrent progress is made on the plurality of sub-campaigns; and
   selectively adjust an intensity of a rate of an individual sub-campaign of the plurality of sub-campaigns.

9. A system for managing outbound communication campaigns comprising:
   processor; and
   memory, wherein the memory has stored therein instructions that, when executed by the processor, cause the processor to:
      export, as a set of one or more web pages, a call pacing configuration tool, the call pacing configuration tool enabling receipt of data defining a call pacing strategy that enables control over pacing of individual sub-campaigns when multiple sub-campaigns are running; and
      execute a communications campaign using the call pacing strategy to pace individual sub-campaigns when the multiple sub-campaigns are running.

10. A system for managing outbound communication campaigns comprising:
   processor; and
   memory, wherein the memory has stored therein instructions that, when executed by the processor, cause the processor to:
      export, as a set of one or more web pages, a call pacing configuration tool, the call pacing configuration tool enabling receipt of data defining a call pacing strategy that enables just-in-time agent allocation; and
      execute a communications campaign using the just-in-time agent allocation.

* * * * *